(12) United States Patent
Kuo et al.

(10) Patent No.: US 8,149,224 B1
(45) Date of Patent: Apr. 3, 2012

(54) COMPUTING SYSTEM WITH DETACHABLE TOUCH SCREEN DEVICE

(75) Inventors: Ordin Kuo, Taipei (TW); Ivan Hsiao, Sunnyvale, CA (US); John Hull, Santa Clara, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 416 days.

(21) Appl. No.: 12/431,693

(22) Filed: Apr. 28, 2009

(51) Int. Cl.
*G06F 3/041* (2006.01)

(52) U.S. Cl. .................. 345/173; 345/156; 345/157

(58) Field of Classification Search .......... 345/157–159, 345/163, 168–169, 173, 507; 708/139, 140; 463/37
See application file for complete search history.

(56) References Cited

U.S. PATENT DOCUMENTS

| | | | | |
|---|---|---|---|---|
| 5,625,673 | A * | 4/1997 | Grewe et al. | 455/556.2 |
| 5,793,355 | A * | 8/1998 | Youens | 345/157 |
| 6,035,350 | A * | 3/2000 | Swamy et al. | 710/73 |
| 6,178,084 | B1 * | 1/2001 | Shibasaki | 361/679.33 |
| 6,388,660 | B1 * | 5/2002 | Manser et al. | 345/173 |
| 6,538,880 | B1 * | 3/2003 | Kamijo et al. | 361/679.4 |
| 6,552,567 | B1 | 4/2003 | Boles et al. | |
| 6,697,251 | B1 * | 2/2004 | Aisenberg | 361/679.09 |
| 6,961,237 | B2 | 11/2005 | Dickie | |
| 7,054,963 | B2 | 5/2006 | Betts-LaCroix et al. | |
| 7,076,270 | B2 | 7/2006 | Jaggers et al. | |
| 7,221,331 | B2 | 5/2007 | Bear et al. | |
| 7,733,637 | B1 * | 6/2010 | Lam | 361/679.11 |
| 2002/0086703 | A1 | 7/2002 | Dimenstein et al. | |
| 2004/0224638 | A1 | 11/2004 | Fadell et al. | |
| 2007/0250653 | A1 * | 10/2007 | Jones | 710/303 |
| 2008/0273297 | A1 * | 11/2008 | Kumar | 361/680 |
| 2009/0262204 | A1 * | 10/2009 | Pai et al. | 348/207.11 |

OTHER PUBLICATIONS

"Dual-Sided Track Pad," available at http://www.unwiredview.com/2008/03/17/iphone-20-iphone-30-or-iphone-nano-a-clamshellflip-phone.

* cited by examiner

*Primary Examiner* — Amare Mengistu
*Assistant Examiner* — Stacy Khoo
(74) *Attorney, Agent, or Firm* — Kenneth Glass; Stanley J. Pawlik; Glass & Associates (57) ABSTRACT

A computing system includes a computer device and a detachable touch screen device. The computer device receives input from a touch screen of a detachable touch screen device when the detachable touch screen device is attached to a touch screen port of the computer device and displays an image on a display device of the computer device based on the input. Further, the detachable touch screen device receives input from the touch screen when the detachable touch screen device is detached from the computer device and displays an image on the touch screen based on the input. In various embodiments, the detachable touch screen device performs a computing function, a communication function, or a media function based on the input to the touch screen when the detachable touch screen device is detached from the computer device.

20 Claims, 9 Drawing Sheets

COMPUTING SYSTEM WITH DETACHABLE TOUCH SCREEN DEVICE

BACKGROUND

In recent years, there has been a proliferation of portable electronic devices. As a result, a typical person carries multiple portable electronic devices on a daily basis. These portable electronic devices include notebook computers, mobile phones, digital cameras, pagers, portable media players, and global positioning systems. Moreover, some of the functionality of a portable electronic device may be duplicated in another portable electronic device.

In light of the above, a need exists to reduce duplication of functionality in portable electronic devices. A further need exists to integrate functionality of portable electronic devices.

SUMMARY

In various embodiments, a computing system includes a computer device and a detachable touch screen device. The detachable touch screen device includes a touch screen for displaying images and receiving input through user contact with the touch screen. The detachable touch screen device generates an image, such as a cursor, based on the user input and displays the image on the touch screen. Further, the detachable touch screen device performs functions based on user input to the touch screen. For example, the detachable touch screen device may execute a software application, receive a communication, transmit a communication, play a video file, or play an audio file, depending on the configuration of the detachable touch screen device. In one embodiment, the detachable touch screen device functions as a portable media player. In another embodiment, the detachable touch screen device functions as a personal computer and a mobile phone.

The computer device includes a touch screen port for attaching the detachable touch screen device to the computer device. When the detachable touch screen device is attached to the computer device through the touch screen port, a communication link is established between the detachable touch screen device and the computer device. Moreover, the computer device receives input from the touch screen of the detachable touch screen device through the communication link. In this way, the computing system integrates the functionality of the touch screen in the detachable touch screen device into the computer device, which avoids duplication of the touch screen in the computer device and the detachable touch screen device.

A computing system, in accordance with one embodiment, includes a computer device and a detachable touch screen device. The detachable touch screen device includes a touch screen for receiving an input. The computer device includes a touch screen port configured to attach the detachable touch screen device to the computer device and establish a communication link between the computer device and the detachable touch screen device for receiving the input in the computer device from the detachable touch screen device. The computer device further includes a display device configured to display an image based on the input.

A computing system, in accordance with one embodiment, includes a computer device and a detachable touch screen device. The detachable touch screen device includes a touch screen, a touch screen controller coupled to the touch screen, and a touch screen device interface coupled to the touch screen controller. The touch screen is configured to receive an input and the touch screen controller is configured to control operation of the touch screen. The computer device includes a touch screen port for attaching the detachable touch screen device to the computer device. The computer device further includes a computer device interface and a display device coupled to the computer device interface. The computer device interface is configured to establish a communication link with the touch screen device interface when the detachable touch screen device is attached to the computer device. Additionally, the computer device interface is configured to receive the input through the communication link. The display device is configured to display an image based on the input.

A method, in accordance with one embodiment, includes receiving an input in a computer device from a touch screen of a detachable touch screen device attached to a touch screen port of the computer device. The method further includes displaying an image on a display device of the computer device based on the input.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a computing system includes a computer device and a detachable touch screen device. The computer device receives input from a touch screen of the detachable touch screen device when the detachable touch screen device is attached to the computer device and displays an image on a display device of the computer device based on the input. Further, the detachable touch screen device receives input from the touch screen when the detachable touch screen device is detached from the computer device and displays an image on the touch screen based on the input. In various embodiments, the detachable touch screen device performs a computing function, a communication function, or a media function based on the input to the touch screen when the detachable touch screen device is detached from the computer device.

Figure 1:
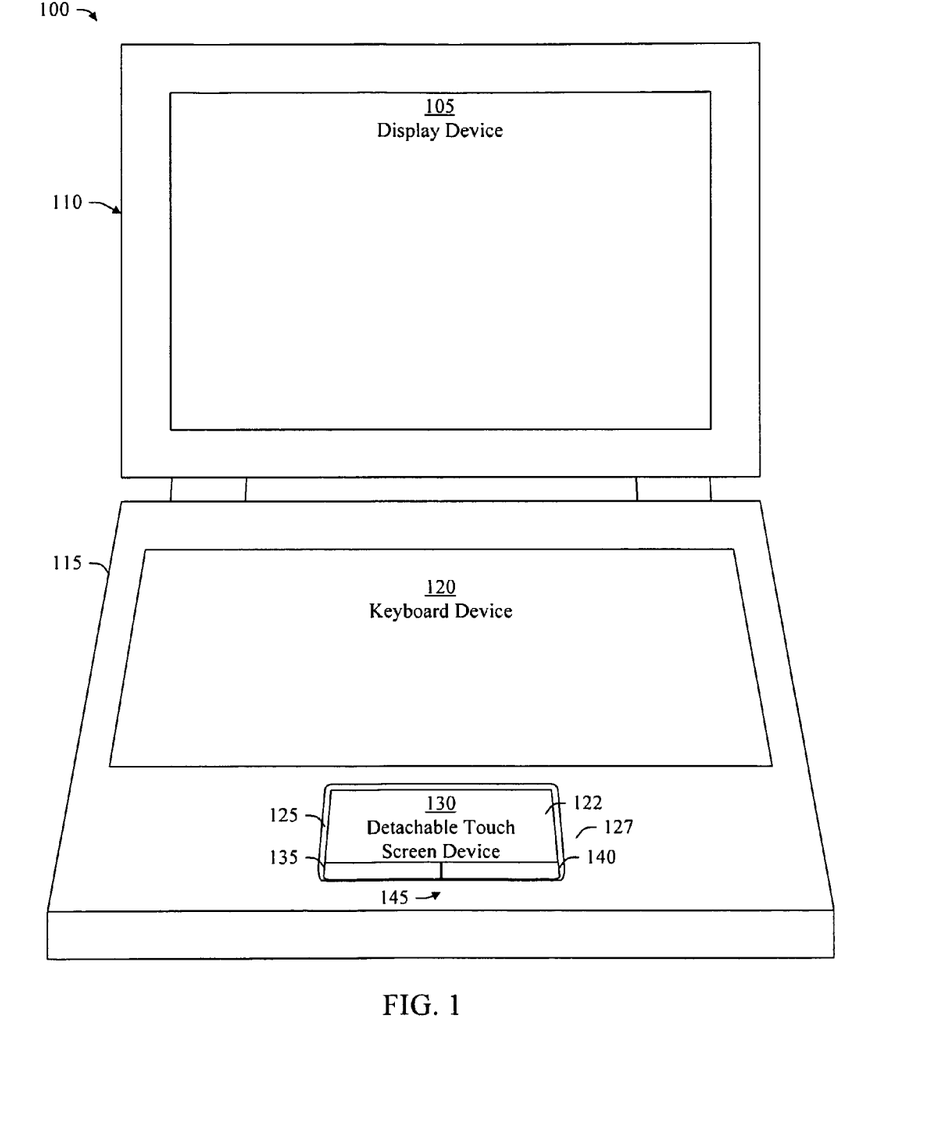
FIG. 1 is perspective view of a computing system including a computer device and a detachable touch screen device, in accordance with an embodiment of the present invention.

FIG. 1 illustrates a computing system 100 including a computer device 110 and a detachable touch screen device 130, in accordance with an embodiment of the present invention. The computer device 110 includes a housing 115, a display device 105 mounted to the housing 115, and a keyboard device 120 mounted to the housing 115. The keyboard device 120 receives data based on user contact with the keyboard device 120. For example, the keyboard device 120 may be an American National Standards Institute (ANSI) keyboard and a user may contact the keyboard device 120 by depressing a key on the keyboard device 120. The display device 105 displays images, such as still images (e.g., pictures) and moving images (e.g., video). For example, the display device 105 may be a liquid crystal display (LCD).

The computer device 110 also includes a touch screen port 125 that is attached to the housing 115. For example, the touch screen port 125 may include a portion of the housing 115 for supporting the detachable touch screen device 130. The touch screen port 125 functions to attach the detachable touch screen device 130 to the computer device 110 through both a mechanical and electrical connection. When the detachable touch screen device 130 is attached to the computer device 110 through the touch screen port 125, the detachable touch screen device 130 functions as a touch pad of the computer device 110. As a result, the computing system 100 need not include another touch pad or a computer mouse input device in some embodiments. Moreover, the touch screen port 125 allows the detachable touch screen device 130 to be readily detached from the computer device 110. For example, a user may readily detach the detachable touch screen device 130 from the computer device 110 by pulling the detachable touch screen device 130 away from the touch screen port 125 to break the mechanical and electrical connections between the detachable touch screen device 130 and the computer device 110.

The computer device 110 further includes computer input devices 145 mounted to the housing 115 near the touch screen port 125. For example, the computer input devices 145 may be adjacent to the touch screen port 125. The computer input devices 145 include a left-click button 135 and a right-click button 140. The left-click button 135 and the right-click button 140 each function to select coordinates of a cursor in an image displayed on the display device 105. For example, a user may depress the left-click button 135 or the right-click button 140 to select x-y coordinates of a cursor in an image displayed on the display device 105. In this way, the computer input devices 145 receive data based on contact with the user. In various embodiments, the detachable touch screen device 130 functions as a touch pad for the computer device 110 and the computer input devices 145 perform the same functions as buttons on a computer mouse input device.

As illustrated in FIG. 1, the detachable touch screen device 130 has a top surface 122 and the housing 115 has a top surface 127. In some embodiments, the top surface 122 of the detachable touch screen device 130 is substantially coplanar (e.g., flush) with the top surface 127 of the housing 115 when the detachable touch screen device 130 is in the touch screen port 125. In other embodiments, the top surface 122 of the detachable touch screen device 130 extends above the top surface 127 of the housing 115 when the detachable touch screen device 130 is in the touch screen port 125. For example, the top surface 122 of the detachable touch screen device 130 may be located above the top surface 127 of the housing 115 by one to five millimeters (1-5 mm) when the detachable touch screen device 130 is in the touch screen port 125.

Figure 2:
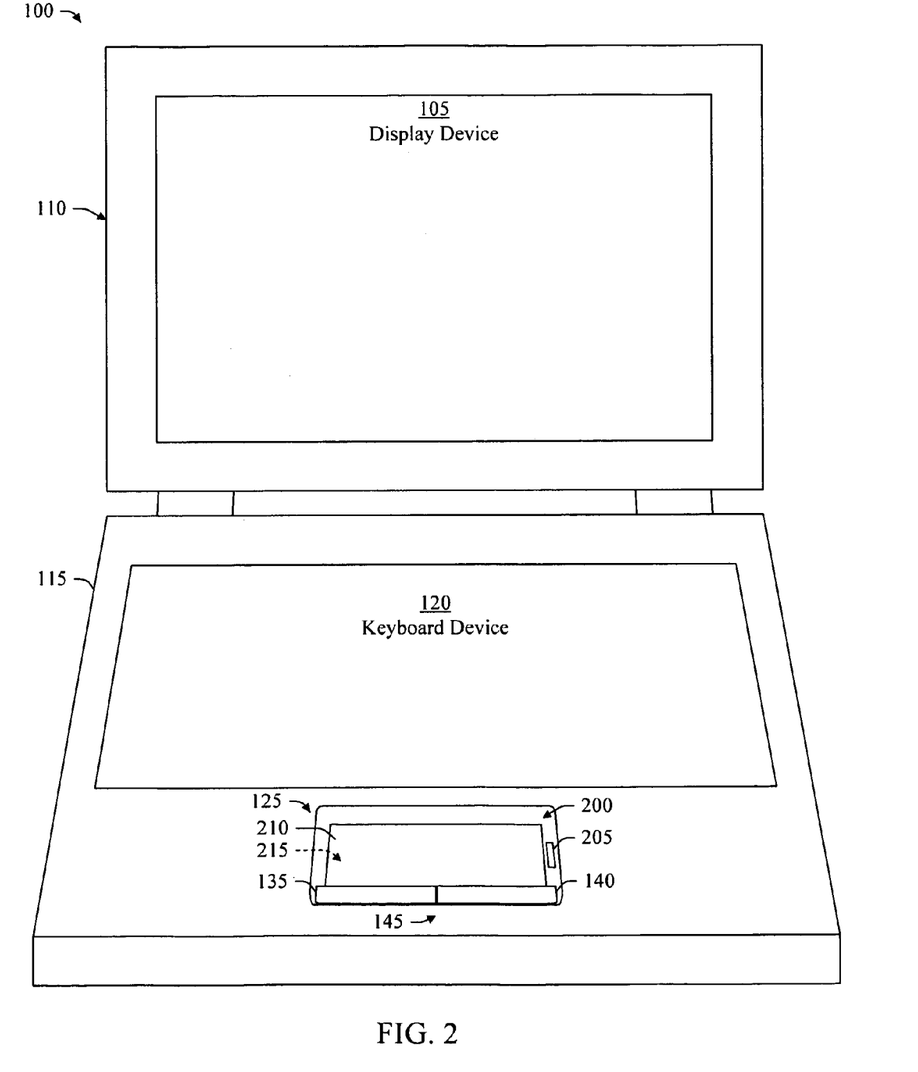
FIG. 2 is a perspective view of the computing system of FIG. 1 without the detachable touch screen device, in accordance with an embodiment of the present invention.

FIG. 2 illustrates the computer device 100 of FIG. 1 after removal of the detachable touch screen device 130 from touch screen port 125, in accordance with an embodiment of the present invention. As illustrated in FIG. 2, the touch screen port 125 includes a recess 200 in the housing 115 of the computer device 110 for receiving the detachable touch screen device 130 and a touch screen port connector 205 for establishing a physical and electrical connection between the detachable touch screen device 130 and the computer device 110. For example, the touch screen port connector 205 may be a universal serial bus (USB) receptacle. In various embodiments, the computing system 100 includes a communication link between the detachable touch screen device 130 and the computer device 110, which is established when the detachable touch screen device 130 is attached to touch screen port 125 (e.g., connected to the touch screen port connector 205), as is described more fully herein.

In various embodiments, the recess 200 has a depth that is substantially the same as a depth of the detachable touch screen device 130. For example, the recess 200 and the detachable touch screen device 130 may each have a depth of ten millimeters (10 mm). In other embodiments, the depth of the recess 200 may be less than the depth of the detachable touch screen device 130. For example, the depth of the detachable touch screen device 130 may be ten millimeters (10 mm) and the depth of the recess 200 may be less than ten millimeters (10 mm). Additionally, the recess 200 includes a supporting surface 210 for supporting the detachable touch screen device 130 when the detachable touch screen device 130 is in the touch screen port 125. In one embodiment, the supporting surface 210 is a surface of the housing 115. In another embodiment, the supporting surface 210 is a surface of a touch pad 215 mounted to the housing 115. In this embodiment, the touch pad 215 is an input device to the computer system 110 when the detachable touch screen device 130 is not in the touch screen port 125. Moreover, a user may input data through the touch pad 215 by contacting the supporting surface 210 of the touch pad 215.

Figure 3:
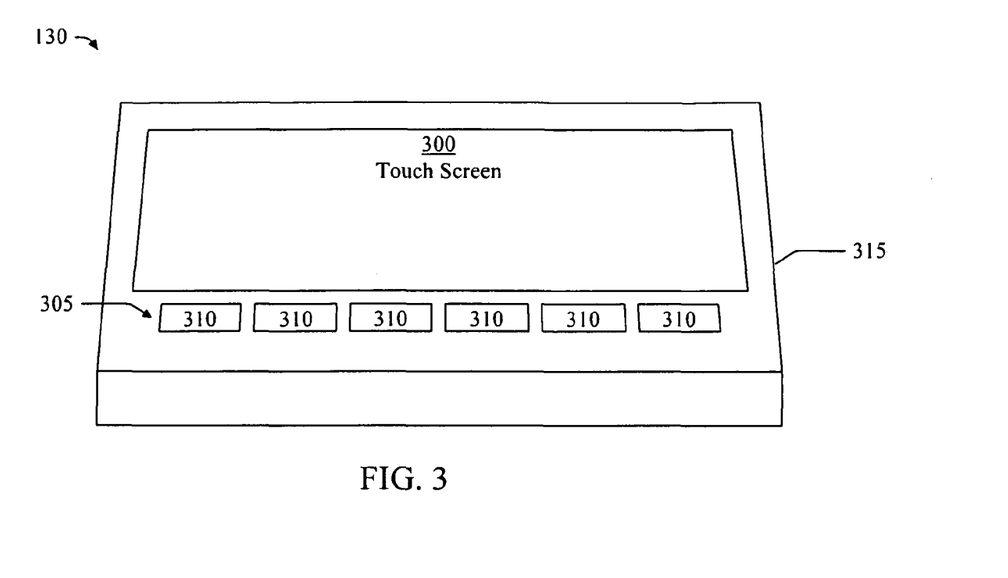
FIG. 3 is a perspective view of the detachable touch screen device of FIG. 1, in accordance with an embodiment of the present invention.

FIG. 3 illustrates the detachable touch screen device 130, in accordance with an embodiment of the present invention. The detachable touch screen device 130 includes a touch screen 300 for displaying images and receiving input (e.g. data) based on contact with the touch screen 300. In various embodiments, the input received by the touch screen 300 indicates a position on the touch screen 300 at which a user contacts the touch screen 300 and may also include a direction and velocity of the contact. In some embodiments, the detachable touch screen device 130 includes an optional data input module 305, which includes one or more buttons 310 for receiving data based on contact with the buttons 310. For example, the buttons 310 may be electrical-mechanical push button switches and the data input module 305 may receive data in response to a user depressing one or more of the buttons 310. As illustrated in FIG. 3, the detachable touch screen device 130 has a side 315 at one end of the detachable touch screen device 130.

Figure 4:
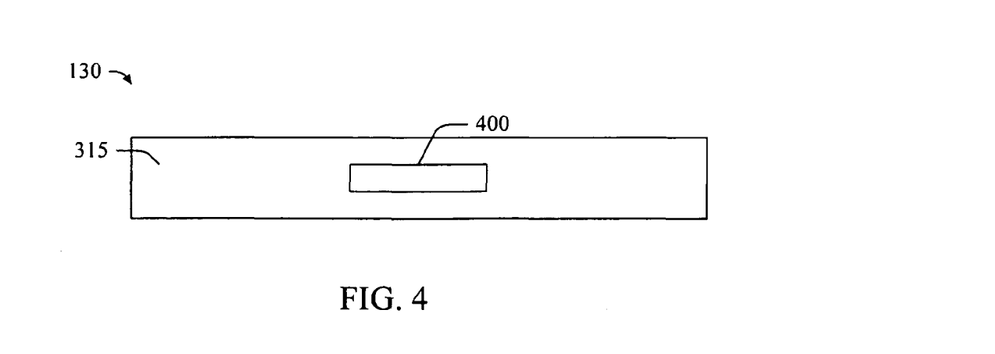
FIG. 4 is a side view of the detachable touch screen device of FIG. 3, in accordance with an embodiment of the present invention.

FIG. 4 illustrates the detachable touch screen device 130, in accordance with an embodiment of the present invention. As illustrated in FIG. 4, the side 315 of the detachable touch screen device 130 includes a detachable touch screen device connector 400 for connecting to the touch screen port connector 205 of the computer device 110. For example, the detachable touch screen device connector 400 of the detachable touch screen device 130 may be a universal serial bus (USB) plug.

Figure 5:
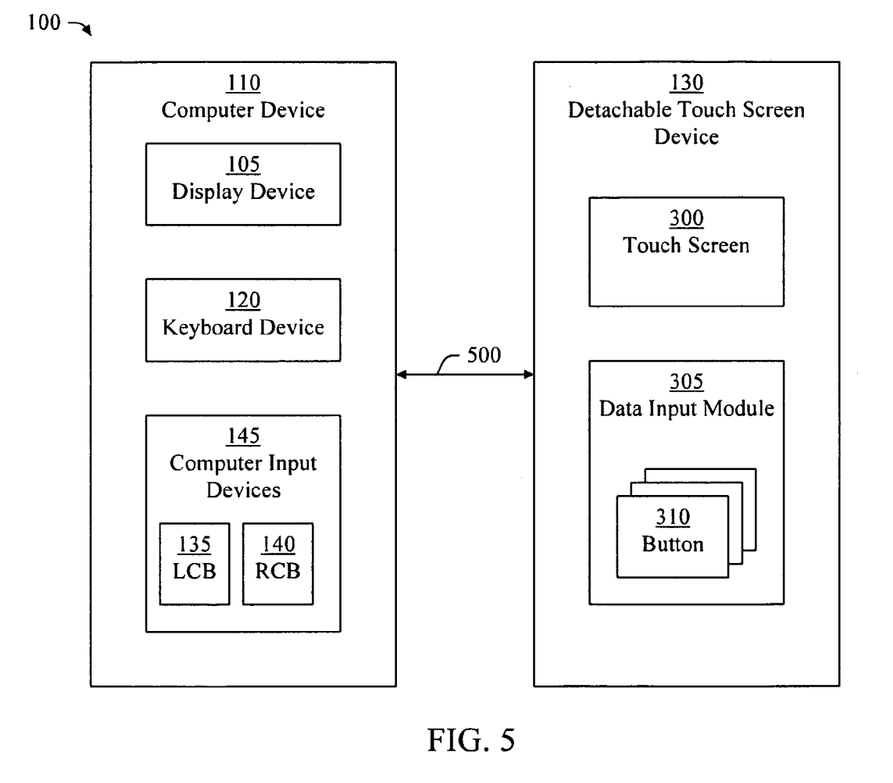
FIG. 5 is a block diagram a computing system, in accordance with an embodiment of the present invention.

FIG. 5 illustrates the computing system 100, in accordance with an embodiment of the present invention. As illustrated in FIG. 5, the computing system 100 and the detachable touch screen device 130 establish a communication link 500 when the detachable touch screen device 130 is attached to the touch screen port 125. Moreover, the detachable touch screen device 130 receives input through the touch screen 300 in response to contact with the touch screen 300 (e.g., user contact) and provides the input to the computer device 110 through the communication link 500. The computer device 110 receives the input from the detachable touch screen device 130 and displays an image, such as a cursor, on the display device 105 based on the input.

In various embodiments, the computer device 110 or the detachable touch screen device 130 generates an image based on input to the touch screen 300 and displays the image on the display device 105. In this way, the computer device 110 displays the image on the display device 105 based on the input to the touch screen 300. In some embodiments, the computer device 110 or the detachable touch screen device 130 generates an image based on input received by the touch screen 300 and the detachable touch screen device 130 displays the image on the touch screen 300. For example, the display device 105 may function as a primary display device and the touch screen 300 may function as a secondary display device.

In some embodiments, the communication link 500 is a wireless communication link. In these embodiments, the touch screen port 125 of the computer device 110 need not include the touch screen port connector 205 and the detachable touch screen device 130 need not include the detachable touch screen device connector 400.

Figure 6:
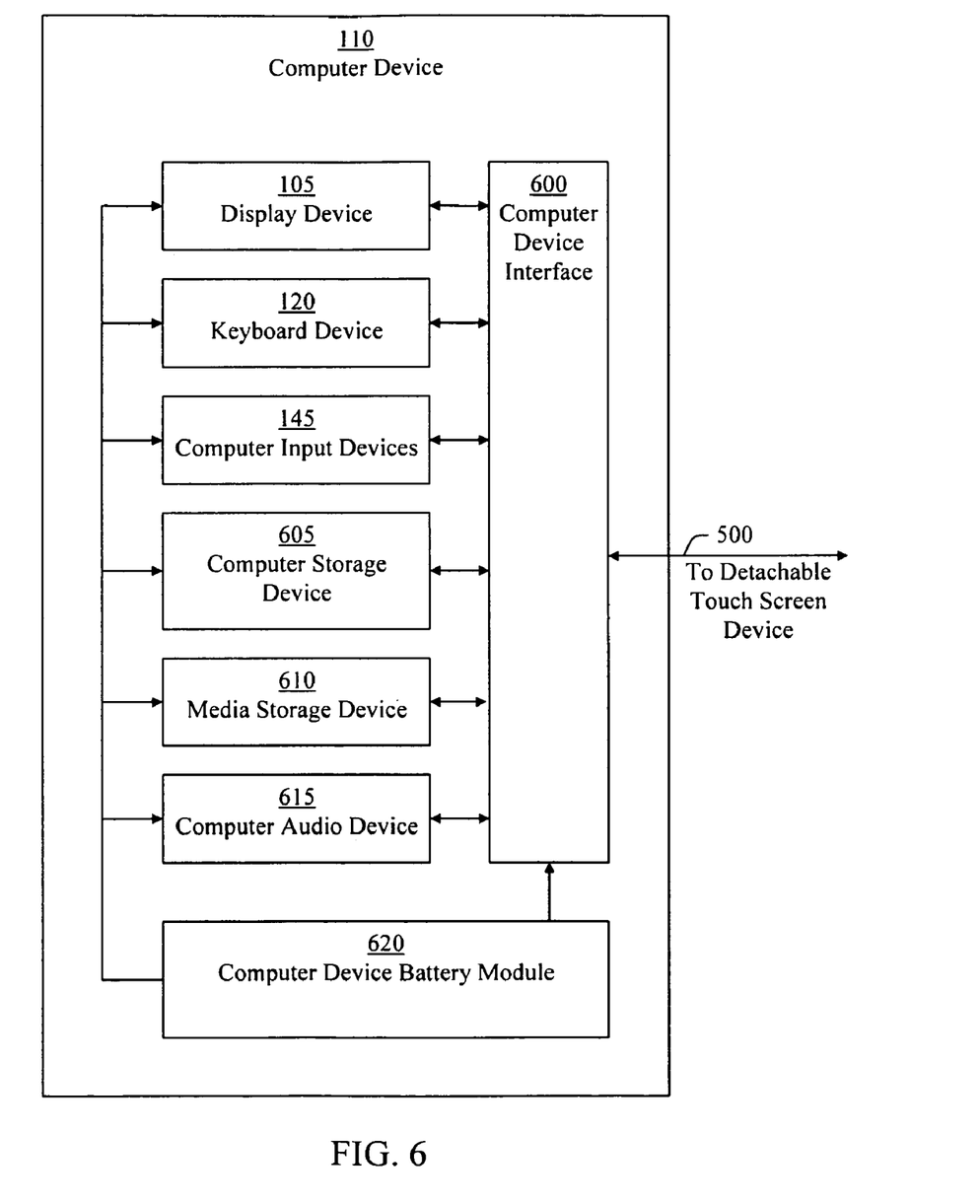
FIG. 6 is a block diagram of a computer device, in accordance with an embodiment of the present invention.

FIG. 6 illustrates the computer device 110, in accordance with an embodiment of the present invention. In this embodiment, the supporting surface 210 is a surface of the housing 115 and the computer device 110 need not include a touch pad permanently attached to the housing 115. In addition to the display device 105, the keyboard device 120, and the computer input devices 145, the computer device 110 includes a computer device interface 600, a computer storage device 605, a media storage device 610, a computer audio device 615, and a computer device battery module 620. The computer device interface 600 is coupled (e.g., electrically connected) to the display device 105, the keyboard device 120, the computer input devices 145, the computer storage device 605, the media storage device 610, the computer audio device 615, and the computer device battery module 620. In this embodiment, the computer device 110 is a computer appliance that functions as a personal computer in conjunction with the detachable touch screen device 130, as is described more fully herein.

The computer device interface 600 may be any interface device for establishing the communication link 500 between the computer device 110 and the detachable touch screen device 130. For example, the computer device interface 600 may be a universal serial bus (USB) interface. The computer storage device 605 may be any non-volatile storage device for storing data. For example, the computer storage device 605 may be a hard disk drive or a flash memory drive. The media storage device 610 may be any storage device that stores data on a removable media. For example, the media storage device 610 may include a compact disc (CD) storage device, a digital versatile disc (DVD) storage device, or a memory card reader, or some combination thereof. The computer audio device 615 may be any audio device for generating an audio output from a digital media file. For example, the computer audio device 615 may include an audio coder-decoder (CODEC), an audio amplifier, and a speaker that function to generate an audio output from a digital media file. The computer device battery module 620 may be any type of rechargeable battery and circuitry for recharging the battery. For example, the computer device battery module 620 may include a lithium-ion battery and a charge circuit for recharging the lithium-ion battery.

Figure 7:
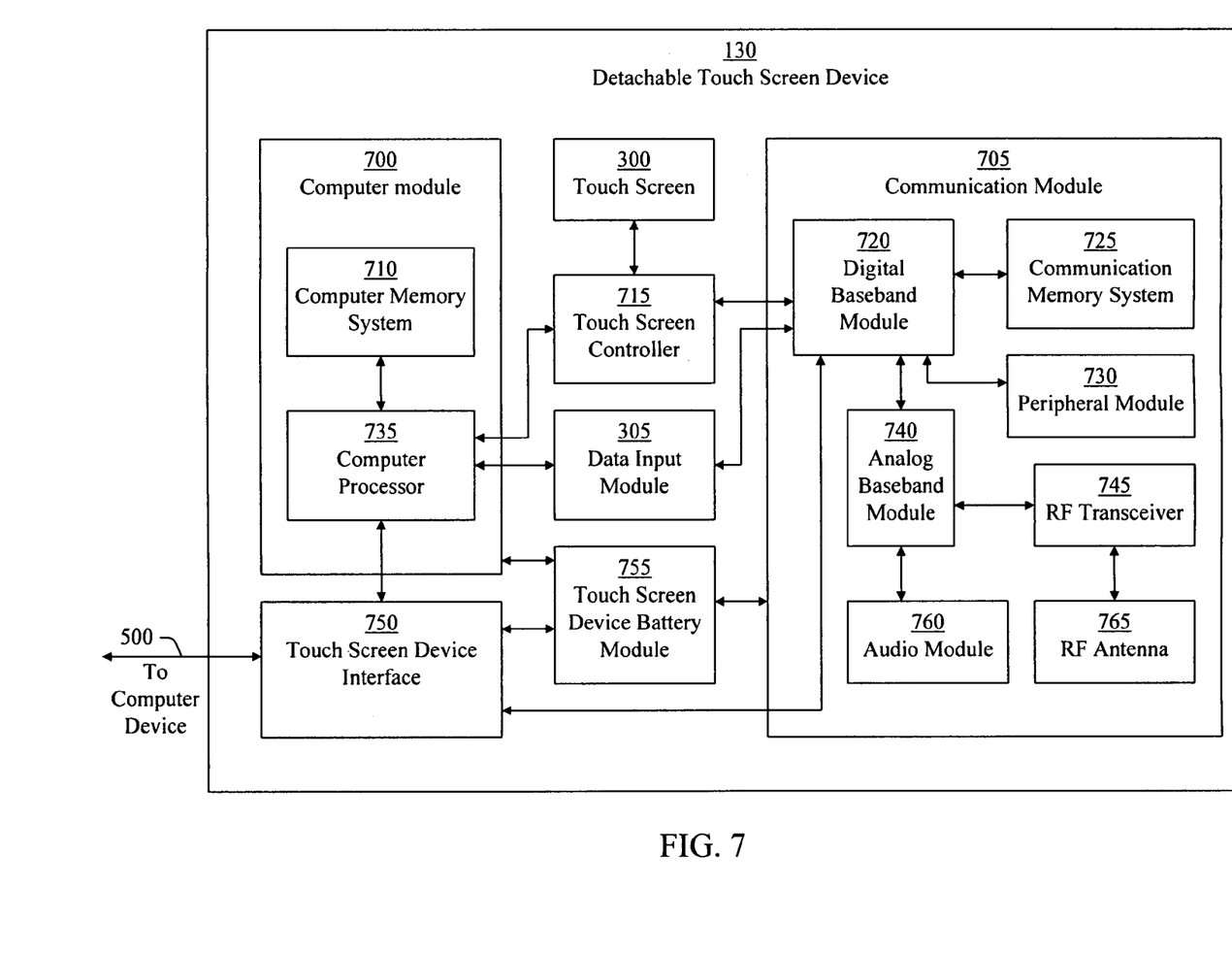
FIG. 7 is a block diagram of a detachable touch screen device, in accordance with an embodiment of the present invention.

FIG. 7 illustrates the detachable touch screen device 130, in accordance with an embodiment of the present invention. In addition to the touch screen 300 and the optional data input module 305, the detachable touch screen device 130 includes a computer module 700, a communication module 705, a touch screen controller 715, a touch screen device interface 750, and a touch screen device battery module 755. The computer module 700 and the communication module 705 are connected (e.g., electrically connected) to the touch screen controller 715, the data input module 305, the touch screen device interface 750, and the touch screen device battery module 755. The touch screen controller 715 is coupled (e.g., electrically connected) to the touch screen 300 and controls operation of the touch screen 300. In this process, the touch screen controller 715 receives input from the touch screen 300 as a result of contact with the touch screen 300 (e.g., user contact). Additionally, the touch screen controller 715 receives image data from the computer module 700 and the communication module 705 and provides the image data to the touch screen 300. In turn, the touch screen 300 displays an image based on the image data received from the touch screen controller 715.

In one configuration, the detachable touch screen device 130 is detached from the computer device 110. In this configuration (i.e., a detached configuration), the computer module 700 in conjunction with the touch screen controller 715, the touch screen 300, and the touch screen device battery module 755 functions as a personal computer powered by the touch screen device battery module 755. For example, the computer module 700 in conjunction with the touch screen controller 715, the touch screen 300, and the touch screen device battery module 755 may execute a conventional operating system, such as Windows XP or Windows Vista, and conventional application software, such as Microsoft Word or Microsoft Excel. Additionally, the communication module 705 in conjunction with the touch screen controller 715, the touch screen 300, and the touch screen device battery module 755 functions as a mobile phone (e.g., a cellular phone) powered by the touch screen device battery module 755.

The touch screen device interface 750 may be any interface device for establishing the communication link 500 with the computer device 110. For example, the touch screen device interface 750 may be a universal serial bus (USB) interface. Moreover, when the detachable touch screen device 130 is attached to the touch screen port 125 and the touch screen port connector 205 of the computer device 110 is connected to the detachable touch screen device connector 400 of the detachable touch screen device 130, the computer module 700 in conjunction with the computer device 110 functions as a personal computer powered by the computer device battery module 620. In this configuration (i.e., an attached configuration) the computer module 700 receives input from the touch screen 300 through the touch screen controller 715 and displays images on the display device 105 based on the input. Moreover, the computer module 700 may generate an image based on input to the touch screen 300 and provide the image to the display device 105 through the communication link 500 established by the touch screen device interface 750 and the computer device interface 600. In turn, the display device 105 displays the image. For example, the computer module 700 in conjunction with the computer device 110 (i.e., the computer appliance) may execute a conventional operating system, such as Windows XP or Windows Vista, and conventional application software, such as Microsoft Word or Microsoft Excel.

Further in this configuration (e.g., the attached configuration), the computer module 700 receives data from keyboard device 120 and data from the computer input devices 145 through the communication link 500. Additionally, the computer module 700 reads data from the computer storage device 605 and writes data to the computer storage device 605 through the communication link 500. Similarly, the computer module 700 reads data from the media storage device 610 and writes data to the media storage device 610 through the communication link 500. The computer module 700 may also provide a digital media file, such as a digital audio file, to the computer audio device 615 through the communication link 500. In turn, the computer audio device 615 generates an audio output based on the digital audio file received from the computer module 700.

In one embodiment, the computer module 700 includes a computer memory system 710 and a computer processor 735. The computer processor 735 may be any processor for executing computing instructions. For example, the computer processor 735 may be a microprocessor, a microcontroller, an embedded controller, or the like. The computer processor 735 is coupled (e.g., electrically connected) to the computer memory system 710 and the touch screen device interface 750. For example, the computer memory system 710 may include a random-access memory (RAM), a read-only memory (ROM), or the like. Additionally, the computer memory system 710 may include a non-volatile storage device, such as a hard disk drive or a flash storage device.

In operation, the computer processor 735 communicates with the touch screen controller 715, the data input module 305, and the touch screen device interface 750 to execute an operating system and application programs. Further, the computer module 700 maintains a file system for accessing files in the computer memory system 710. In this way, data files may be maintained in the detachable touch screen device 130 and accessed through the computer device 110 without changing the file system. Moreover, the detachable touch screen device 130 may be attached to more than one computer device 110, one at a time, and the computer device 110 attached to the detachable touch screen device 130 may access data files in the detachable touch screen device 130 without changing the file system.

In various embodiments, the communication module 705 receives communications and transmits communications. For example, the communication module 705 may function as a mobile phone (e.g., a cellular phone) and the communications may be phone conversations, text messages, or web pages. In one embodiment, the communication module 705 includes a digital baseband module 720, a communication memory system 725, a peripheral module 730, an analog baseband module 740, a radio-frequency (RF) transceiver 745, an audio module 760, and a radio-frequency (RF) antenna 765. The digital baseband module 720 is coupled (e.g., electrically connected) to the touch screen controller 715, the data input module 305, the communication memory system 725, the peripheral module 730, the analog baseband module 740, and the touch screen device interface 750. Additionally, the analog baseband module 740, is coupled (e.g., electrically connected) to the radio-frequency transceiver 745 and the audio module 760, and the radio-frequency transceiver 745 is coupled (e.g., electrically connected) to the radio-frequency antenna 765.

In operation, the radio-frequency antenna 765 receives a radio-frequency signal including a wireless communication. The radio-frequency transceiver 745 detects the radio-frequency signal received by the radio-frequency antenna 765 and amplifies the radio-frequency signal. In this way, the radio-frequency transceiver 745 receives the radio-frequency signal. The analog baseband module 740 converts the radio-frequency signal received by the radio-frequency transceiver 745 into digital data, and the audio module 760 generates an audio output based on the digital data. The digital baseband module 720 receives digital data from the analog baseband module 740 and the communication memory system 725 and processes the digital data, for example by performing digital signal processing operations on the digital data. Additionally, the digital baseband module 720 receives input from the touch screen 300 through the touch screen controller 715 for controlling operation of the communication module 705. The digital baseband module 720 also reads digital data from the communication memory system 725 and writes digital data to the communication memory system 725. The communication memory system 725 stores digital data. For example, the communication memory system 725 may include a random-access memory (RAM), a read-only memory (ROM), flash storage, or the like.

Further, the analog baseband module 740 receives digital data from the digital baseband module 720 and converts the digital data into an analog signal. The radio-frequency transceiver 745 generates a radio-frequency signal by modulating and amplifying the analog signal received from the analog baseband module 740 and provides the radio-frequency signal to the radio-frequency antenna 765. In this way, the radio-frequency transceiver 745 transmits a wireless communication in the radio-frequency signal. In turn, the radio-frequency antenna 765 emits the radio-frequency signal received from the radio-frequency transceiver 745.

In various embodiments, the data input module 305 provides data to the computer module 700 or the communication module 705, or both, based on user input. For example, the data input module 305 may include a button 310 (e.g., a push button switch) that generates data by being depressed by a user of the detachable touch screen device 130. In some embodiments, the data input module 305 is optional. In various embodiments, the peripheral module 730 includes one or more peripheral devices, such as a digital camera or a global positioning system, that provide digital data to the digital baseband module 720. In some embodiments, the peripheral module 730 is optional.

Figure 8:
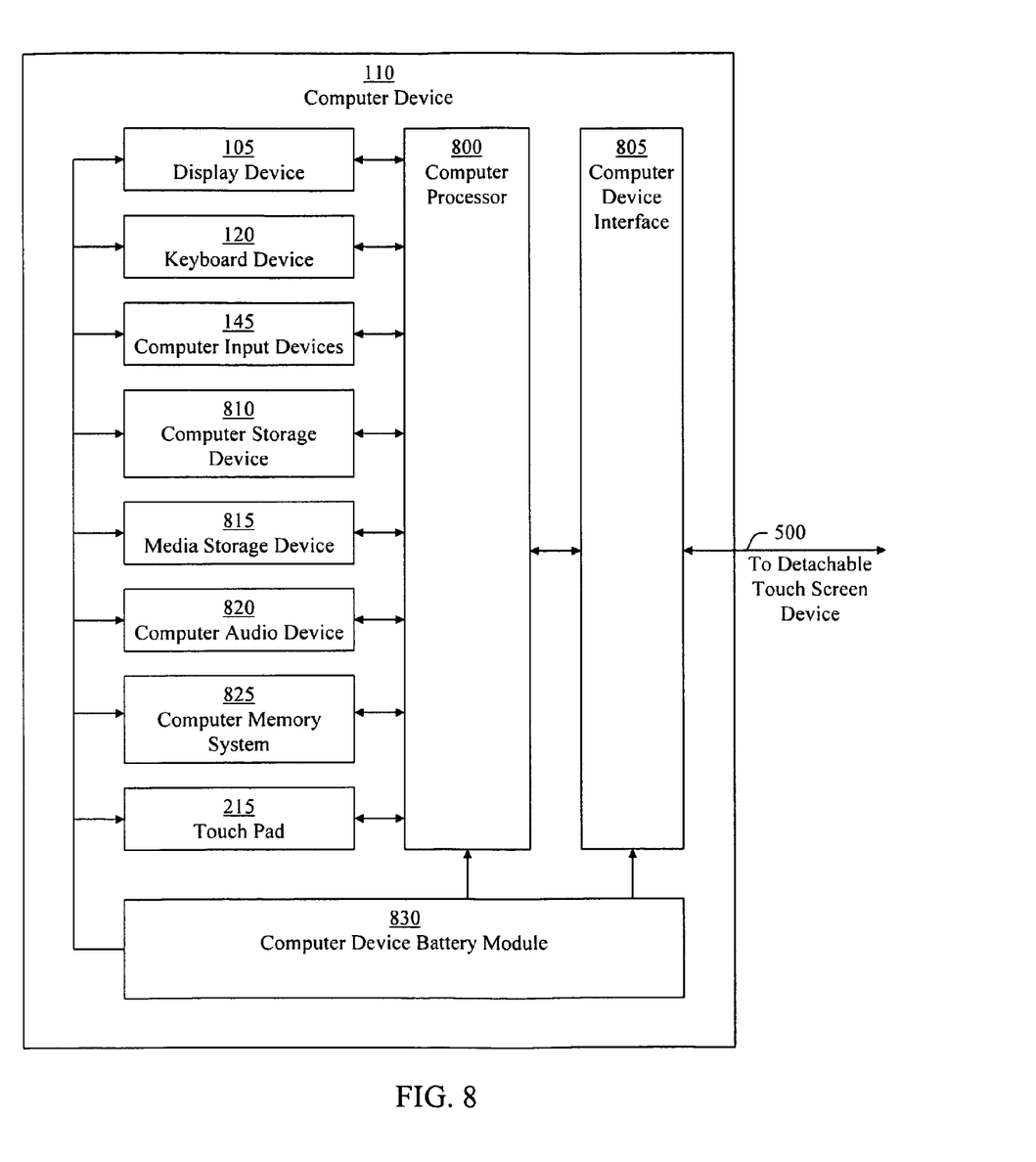
FIG. 8 is a block diagram of a computer device, in accordance with an embodiment of the present invention.

FIG. 8 illustrates the computer device 110, in accordance with an embodiment of the present invention. In addition to the display device 105, the keyboard device 120, and the computer input devices 145, the computer device 110 includes a computer processor 800, a computer device interface 805, a computer storage device 810, a media storage device 815, a computer audio device 820, a computer memory system 825, the touch pad 215, and a computer device battery module 830. In this embodiment, the supporting surface 210 is a top surface of the touch pad 215. The computer processor 800 is coupled (e.g., electrically connected) to the display device 105, the keyboard device 120, and the computer input devices 145. Further, the computer processor 800 is coupled (e.g., electrically connected) to the computer device interface 805, the computer storage device 810, the media storage device 815, the computer audio device 820, the computer memory system 825, the touch pad 215, and the computer device battery module 830. Additionally, the computer device interface 805 is coupled (e.g., electrically connected) to the computer device battery module 830. In this embodiment, the computer device 110 functions as a personal computer. For example, the computer device 110 may execute a conventional operating system, such as Windows XP or Windows Vista, and conventional application software, such as Microsoft Word or Microsoft Excel.

The computer device interface 805 may be any interface device for establishing the communication link 500 between the computer device 110 and the detachable touch screen device 130. For example, the computer device interface 805 may be a universal serial bus (USB) interface. The computer storage device 810 may be any non-volatile storage device for storing data. For example, the computer storage device 810 may be a hard disk drive or a flash memory drive. The media storage device 815 may be any storage device that stores data on a removable media. For example, the media storage device 815 may be a compact disc (CD) storage device or a digital versatile disc (DVD) storage device. The computer audio device 820 may be any audio device for generating an audio output from a digital media file. For example, the audio device 820 may include an audio coder-decoder (CODEC), an audio amplifier, and a speaker that function to generate an audio output from a digital media file. The computer device battery module 830 may be any type of rechargeable battery and circuitry for recharging the battery. For example, the computer device battery module 830 may include a lithium-ion battery and a charge circuit for recharging the lithium-ion battery.

Figure 9:
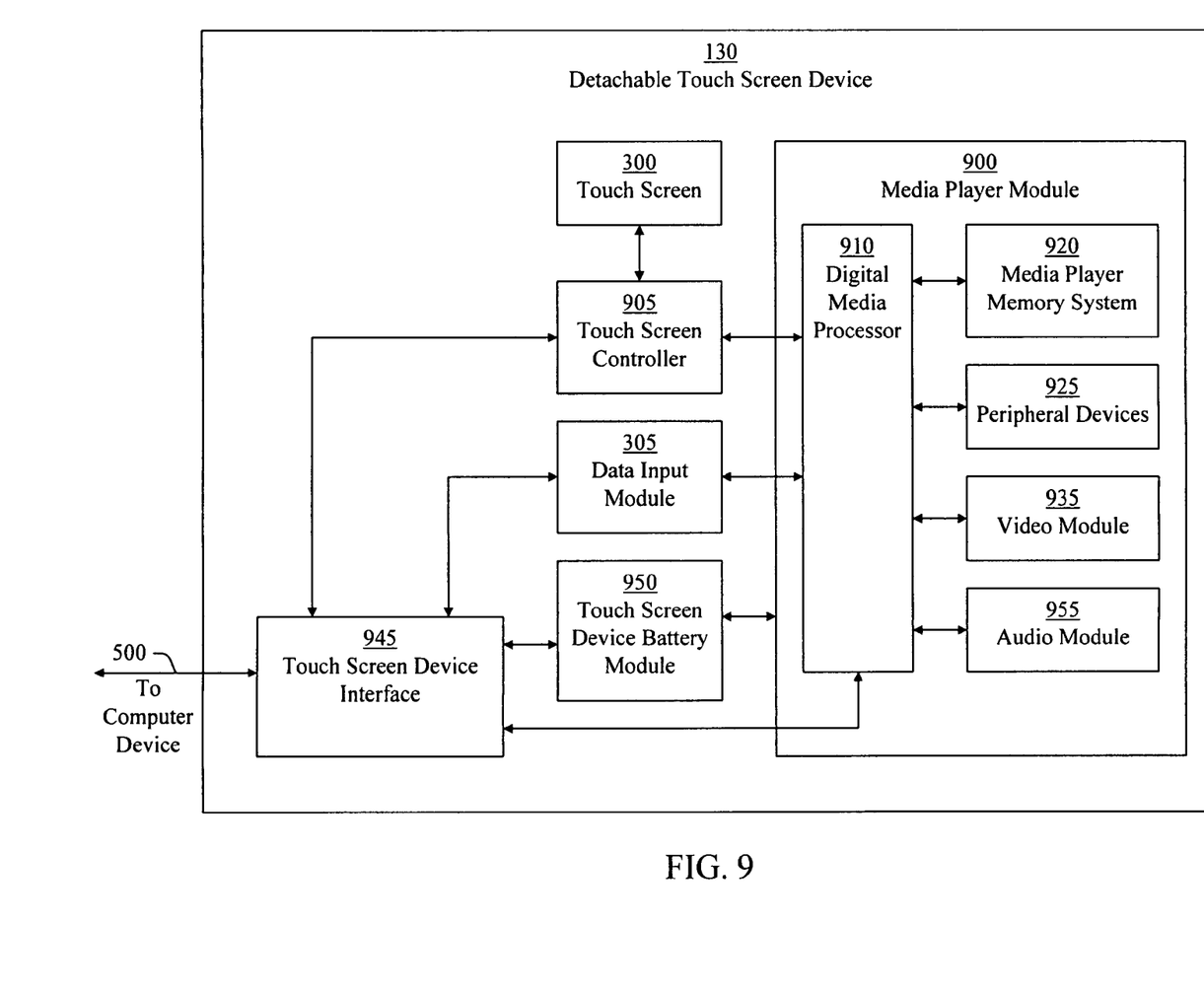
FIG. 9 is a block diagram of a detachable touch screen device, in accordance with an embodiment of the present invention.

FIG. 9 illustrates the detachable touch screen device 130, in accordance with an embodiment of the present invention. In addition to the touch screen 300 and the optional data input module 305, the detachable touch screen device 130 includes a media player module 900, a touch screen controller 905, a touch screen device interface 945, and a touch screen device battery module 950. The media player module 900 is connected (e.g., electrically connected) to the touch screen controller 905, the data input module 305, the touch screen device interface 945, and the touch screen device battery module 950. The touch screen controller 905 is coupled (e.g., electrically connected) to the touch screen 300 and controls operation of the touch screen 300. In this process, the touch screen controller 905 receives input from the touch screen 300 as a result of contact with the touch screen 300 (e.g., user contact). Additionally, the touch screen controller 905 receives image data from the media player module 900 and provides the image data to the touch screen 300. In turn, the touch screen 300 displays an image based on the image data received from the touch screen controller 905.

In one configuration, the detachable touch screen device 130 is detached from the computer device 110. In this configuration (i.e., a detached configuration), the media player module 900 in conjunction with the touch screen controller 905, the touch screen 300, and the touch screen device battery module 950 functions as a personal media player powered by the touch screen device battery module 950. For example, the media player module 900 in conjunction with the touch screen controller 905, the touch screen 300, and the touch screen device battery module 950 may play a digital media file, such as a digital audio file or a digital video file. The touch screen device interface 945 may be any interface device for establishing the communication link 500 with the computer device 110. For example, the touch screen device interface 945 may be a universal serial bus (USB) interface. In various embodiments, the detachable touch screen device 130 plays Moving Pictures Experts Group layer 3 (MP3) media files or Moving Pictures Experts Group layer 4 (MP4) media files, or both.

In one configuration (e.g., an attached configuration), the detachable touch screen device 130 is attached to the touch screen port 125 and the media player module 900 in conjunction with the computer device 110 functions as a personal media player powered by the computer device battery module 830. In this configuration, the computer device 110 receives a digital media file, such as a digital audio file, from the detachable touch screen device 130 through the communication link 500 and plays the digital media file. For example, the computer audio device 820 may generate an audio output based on a digital media file received from the detachable touch screen device 130 with a higher quality than the quality of audio output generated by the detachable touch screen device 130. As another example, the display device 105 may display images based on a digital video file received from the detachable touch screen device 130 with a higher quality than the quality of video output generated by the detachable touch screen device 130 on the touch screen 300.

Further, the computer device 110 may receive input from the touch screen 300 through the communication link 500 and the display device 105 may display an image based on the input. For example, the display device 105 may display a cursor based on the input. Additionally, the computer device 110 may generate an image based on input received from the touch screen 300 through the communication link 500 and the display device 105 may display the image. In this way, the computer device 110 displays the image based on the input received from the touch screen 300.

In various embodiments, the computer device 110 may generate an image and provide the image to the detachable touch screen device 130 through the communication link 500. In turn, the detachable touch screen device 130 displays the image. For example, the touch screen 300 may display the image received from the computer device 110. In this way, the display device 105 of the computer device 110 functions as a primary display device and the touch screen 300 functions as a secondary display device.

Further in this configuration (e.g., the attached configuration), the computer processor 800 receives data from keyboard device 120, receives data from the computer input devices 145, reads data from the computer storage device 810, and writes data to the computer storage device 810. In some embodiments, the computer device 110 receives data, such as a data file, from the detachable touch screen device 130 through the communication link 500 and stores the data in the computer storage device 810. Additionally, the computer device 110 provides data, such as a data file, to the detachable touch screen device 130 through the communication link 500 and the detachable touch screen device 130 stores the data received from the computer device 110. Similarly, the computer processor 800 reads data from the media storage device 815, writes data to the media storage device 815, and transfers data between the computer device 110 and the detachable touch screen device 130 through the communication link 500.

In one embodiment, the media player module 900 includes a digital media processor 910, a media player memory system 920, an optional video module 935, and an audio module 955. The digital media processor 910 is coupled (e.g., electrically connected) to the touch screen controller 905, the optional data input module 305, and the touch screen device battery module 950. Additionally, the digital media processor 910 is coupled (e.g., electrically connected) to the media player memory system 920, the video module 935, and the audio module 955.

The digital media processor 910 may be any processor for processing digital media data, such as a digital media file. For example, the digital media processor 910 may include a digital signal processor, a microprocessor, a microcontroller, an embedded controller, or the like. The media player memory system 920 may be any system or device for storing digital media data. For example, the media player memory system 920 may include a random-access memory (RAM), a read-only memory (ROM), or the like. Additionally, the media player memory system 920 may include a non-volatile storage device, such as a hard disk drive or a flash storage device.

The video module 935 may be any system or device for encoding or decoding digital video data. For example, the video module 935 may include a video coder-decoder (CODEC) for encoding or decoding a digital video file. In some embodiments, the video module 935 is optional. The audio module 955 may be any system or device for encoding or decoding digital audio data. For example, the audio module 955 may include an audio coder-decoder (CODEC) for encoding or decoding a digital audio data file. In some embodiments, the media player module 900 includes one or more optional peripheral devices 925 coupled to the digital media processor 910. For example, the peripheral devices 925 may include a digital camera device.

In operation, the digital media processor 910 receives input from the touch screen 300 through the touch screen controller 905. Additionally, the digital media processor 910 provides data (e.g., image data) to the touch screen 300 through the touch screen controller 905 and the touch screen 300 displays an image based on the data. Additionally, the digital media processor 910 reads data from the media player memory system 920 and writes data to the media player memory system 920. Further, the digital media processor 910 works in conjunction with the peripheral devices 925, the video module 935, and the audio module 955 to process digital media data. For example, the digital media processor 910 may convert data into a digital media format.

In various embodiments, the data input module 305 provides data to the media player module 900, based on user input. For example, the data input module 305 may include a button 310 that generates data by being depressed by a user of the detachable touch screen device 130. In some embodiments, the data input module 305 includes buttons 310 for controlling operation of the detachable touch screen device 130. For example, the data input module 305 may include buttons 310 that generate data indicating a play function, a stop function, a fast-forward function, a reverse function, a pause function, a volume increase function, or a volume decrease function for playing a digital media file. In some embodiments, the data input module 305 is optional.

In various embodiments, the data input module 305 provides data to the computer device 110 through the communication link 500 in the attached configuration. For example, the buttons 310 of the data input module 305 may generate data indicating scrolling functions for the display device 105, such as a scroll left function, a scroll right function, a scroll up function, and a scroll down functions. In this way, the buttons 310 generate data indicating functions for the detachable touch screen device 130 in the detached configuration and the same buttons 310 generate data indicating functions for the computer device 110 in the attached configuration.

In one embodiment, the detachable touch screen device 130 functions as a character recognition device. In this embodiment, the touch screen controller 905 provides data to the touch screen 300 for displaying characters of a language, such as Chinese. The touch screen 300 displays the characters and receives input based on contact with the touch screen 300 indicating a selected character. For example, a user may contact a character displayed on the touch screen 300 to select the character and generate an input in touch screen 300 identifying the selected character. In turn, the touch screen controller 905 provides the input indicating the selected character to the computer device 110 through the communication link 500. In this way, the detachable touch screen device 130 preprocesses the input from the touch screen 300 for the computer device 110.

In one embodiments, the detachable touch screen device 130 functions as a handwriting recognition device. In this embodiment, the touch screen 300 receives input based on contact with the touch screen 300 indicating a handwritten character. For example, a user may contact the touch screen 300 to indicate the handwritten character and generate inputs in touch screen 300 indicating the handwritten character. In turn, the touch screen controller 905 identifies characters based on the inputs from the touch screen 300 and provides an input indicating the handwritten character to the computer device 110 through the communication link 500. In this way, the detachable touch screen device 130 preprocesses the input from the touch screen 300 for the computer device 110.

In some embodiments, the detachable touch screen device 130 functions as an electronic tablet. In these embodiments, the touch screen 300 of the detachable touch screen device 130 displays designated areas, such as check boxes, and a user contacts the designated areas to provide input to the detachable touch screen device 130. In further embodiments, the detachable touch screen device 130 may communicate with the computer device 110 over a wireless communication link to provide data to the computer device 110 based on the user input to the detachable touch screen device 130. In some embodiments, the computer device 110 may provide data to the detachable touch screen device 130 over the wireless communication link, for example to control operation of the detachable touch screen device 130 or to store the data in the detachable touch screen device 130.

Figure 10:
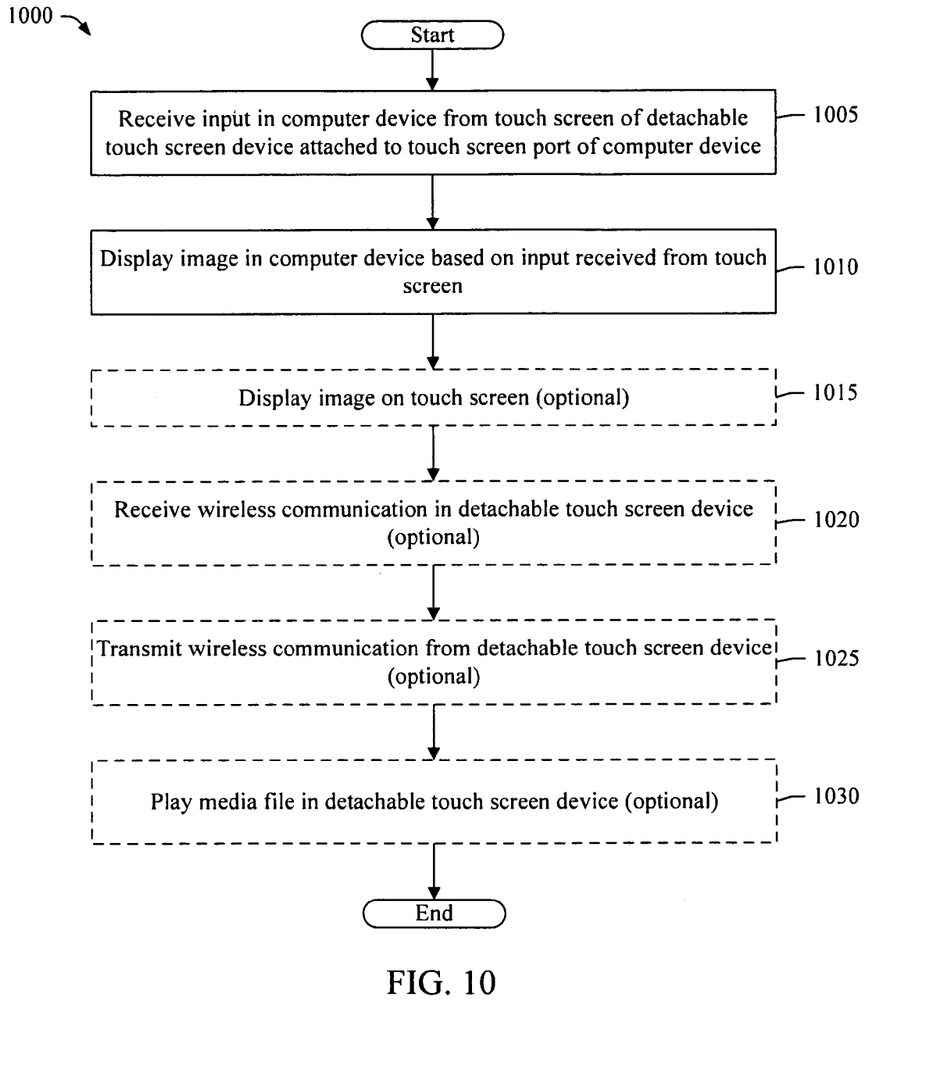
FIG. 10 is a flow chart of a method of displaying an image on a computer device based on input received from a touch screen of a detachable touch screen device, in accordance with an embodiment of the present invention.

FIG. 10 illustrates a method 1000 of displaying an image on a computer device based on input received from a touch screen of a detachable touch screen device, in accordance with an embodiment of the present invention. In step 1005, an input is received in a computer device from a touch screen of a detachable touch screen device attached to a touch screen port of the computer device. In various embodiments, the computer device 110 receives an input from the touch screen 300 of the detachable touch screen device 130 through the communication link 500 when the detachable touch screen device 130 is attached to the touch screen port 125 of the computer device 110. For example, the computer device 110 may receive an input from the touch screen 300 of the detachable touch screen device 130 in an attached configuration in which the detachable touch screen device 130 is attached to the computer device 110 through the touch screen port 125 of the computer device 110. The method 1000 then proceeds to step 1010.

In step 1010, an image is displayed in the computer device based on the input received from the touch screen. In various embodiments, the display device 105 of the computer device 110 displays an image based on the input received from the touch screen 300 of the detachable touch screen device 130. For example, the display device 105 may display a cursor based on the input received from the touch screen 300. In some embodiments, the computer module 700 of the detachable touch screen device 130 generates the image based on the input of the touch screen 300. In some embodiments, the computer processor 800 of the computer device 110 generates the image based on the input of the touch screen 300. The method 1000 then proceeds to step 1015.

In optional step 1015, an image is displayed on the touch screen. In various embodiments, the computer device 110 generates an image and the touch screen 300 of the detachable touch screen device 130 displays the image. In some embodiments, the computer device 110 generates an image in conjunction with the computer module 700 of the detachable touch screen device 130 and the touch screen 300 of the detachable touch screen device 130 displays the image. The method 1000 then proceeds to step 1020.

In optional step 1020, a wireless communication is received in the detachable touch screen device. In various embodiments, the communication module 705 of the detachable touch screen device 130 receives a wireless communication in a radio-frequency signal. For example, the wireless communication may be a phone call or a text message. In these embodiments, the detachable touch screen device 130 functions as mobile phone. The method 1000 then proceeds to step 1025.

In optional step 1025, a wireless communication is transmitted from the detachable touch screen device. In various embodiments, the communication module 705 of the detachable touch screen device 130 transmits a wireless communication in a radio-frequency signal. For example, the wireless communication may be a phone call or a text message. In these embodiments, the detachable touch screen device 130 functions as mobile phone. The method 1000 then proceeds to step 1030.

In optional step 1030, a media file is played in the detachable touch screen device. In various embodiments, the media player module 900 plays a digital media file. For example, the media player module 900 may play a digital audio file to generate an audio output. As another example, the media player module 900 may play a digital video file to generate video images and the touch screen 300 may display the video images. The method 1000 then ends.

In various embodiments, the method 1000 may include more or fewer steps than the steps 1005-1030 described above and illustrated in FIG. 10. In some embodiments, one or more of the steps 1005-1030 of the method 1000 may be performed in parallel or substantially simultaneously. In various embodiments, the steps 1005-1030 of the method 1000 may be performed more than once or in a different order than the order described above and illustrated in FIG. 10.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A computing system comprising:
a detachable touch screen device comprising;
a touch screen for receiving an input; and
a computing processor coupled to the touch screen and configured to execute computing instructions; and
a computer device comprising:
a housing;
a touch pad mounted to the housing and comprising a top surface;
a touch screen port comprising:
a touch screen port connector configured to attach the detachable touch screen device to the computer device and to establish a communication link between the computer device and the detachable touch screen device for receiving the input from the detachable touch screen device; and
a recess in the housing of the computer device for receiving the detachable touch screen device, the recess comprising the top surface of the touch pad for supporting the detachable touch screen device when the detachable touch screen device is in the touch screen port; and
a display device coupled to the communication link and configured to display an image based on the input.

2. The computing system of claim 1, wherein the computer device is a computer appliance and is configured to function as a personal computer in combination with the detachable touch screen device.

3. The computing system of claim 1, wherein the detachable touch screen device is further configured to function as a mobile phone and the computing processor of the detachable touch screen device is further configured to execute an operating system.

4. The computing system of claim 1, wherein the computer device is configured to function as a personal computer independently of the detectable touch screen device, and the detachable touch screen device is configured to function as a personal media player independently of the computer device.

5. The computing system of claim 1, wherein the computer device is a personal computer comprising a computing processor and a computer memory system.

6. The computing system of claim 1, wherein the computing processor of the detachable touch screen device is further configured to execute an operating system.

7. The computing system of claim 1, wherein the detachable touch screen device is further configured to receive a data file from the computer device through the communication link and store the data file.

8. The computing system of claim 1, wherein the detachable touch screen device is further configured to maintain a file system, and the computer device is further configured to access data files in the file system of the detachable touch screen device.

9. The computing system of claim 1, wherein the detachable touch screen device includes a push button switch configured to control operation of the detachable touch screen device for playing a media file when the detachable touch screen device is detached from the touch screen port and configured to control operation of the computer device when the detachable touch screen device is attached to the touch screen port.

10. The computing system of claim 9, wherein the push button switch is further configured to perform a scrolling function on the display device when the detachable touch screen device is attached to the touch screen port.

11. The computing system of claim 1, wherein the computer device is further configured to receive a digital media file from the detachable touch screen device and play the digital media file.

12. The computing system of claim 1, wherein the communication link is a wireless communication link.

13. The computing system of claim 1, wherein the touch screen port connector is further configured to attach the detachable touch screen device to the computer device through both a mechanical connection and an electrical connection.

14. A computing system comprising:
a detachable touch screen device comprising:
- a touch screen for receiving an input;
- a memory system; and
- a computing processor coupled to the touch screen and the memory system, the computing processor configured to execute an operating system; and a computer device comprising:
- a housing comprising a top surface;
- a display device mounted to the housing;
- a keyboard device mounted to the housing;
- a touch pad mounted to the housing and comprising a top surface; and
- a touch screen port formed in the housing and comprising:
  - a recess for receiving the detachable touch screen device, the recess comprising the top surface of the touch pad for supporting the detachable touch screen device when the detachable touch screen device is attached to the touch screen port; and
  - a touch screen port connector for attaching the detachable touch screen device to the touch screen port and to establish a communication link between the computer device and the detachable touch screen device.

15. The computing system of claim 14, wherein the detachable touch screen device is further configured to maintain a file system, and the computer device is further configured to access data files in the file system of the detachable touch screen device.

16. The computing system of claim 14, wherein a top surface of the detachable touch screen device is flush with the top surface of the housing when the detachable touch screen device is attached to the touch screen port.

17. The computing system of claim 14, wherein a depth of the recess is less than a depth of the detachable touch screen device.

18. A method comprising:
- attaching a detachable touch screen device to a touch screen port of a computer device comprising a touch pad, the touch screen port comprising a recess for receiving the detachable touch screen device, the recess comprising a top surface of the touch pad for supporting the detachable touch screen device when the detachable touch screen device is in the touch screen port,
- receiving an input from a touch screen of the detachable touch screen device when the detachable touch screen device is attached to the touch screen port of the computer device; and
- displaying an image on a display device of the computer device based on the input.

19. The method of claim 18, further comprising:
- maintaining a file system in the detachable touch screen device; and
- accessing a data file in the file system of the detachable touch screen device by the computer device.

20. The method of claim 18, further comprising:
- receiving a digital media file in the computer device from the detachable touch screen device; and
- playing the received digital media file in the computer device.

* * * * *